United States Patent [19]
Weigel et al.

[11] Patent Number: 5,779,766
[45] Date of Patent: Jul. 14, 1998

[54] GAS SEPARATION WITH LITHIUM-CONTAINING ZSM-2 METALLOSILICATES

[75] Inventors: Scott Jeffrey Weigel, Goleta, Calif.; James Edward MacDougall, New Tripoli; Charles Gardner Coe, Macungie, both of Pa.; Yan Liang Xiong, Xiamen, China; Johan Adriaan Martens, Huldenberg, Belgium; Pierre A. Jacobs, Gooik, Belgium; Paul Anthony Webley, Macungie, Pa.

[73] Assignee: Air Products and Chemicals, Inc., Allentown, Pa.

[21] Appl. No.: 635,158

[22] Filed: Apr. 23, 1996

Related U.S. Application Data

[63] Continuation-in-part of Ser. No. 241,929, May 12, 1994, abandoned.

[51] Int. Cl.[6] ............................................. B01D 53/02
[52] U.S. Cl. ........................................ 95/96; 95/138
[58] Field of Search ........................ 95/130, 148, 95, 95/96, 138

[56] References Cited

U.S. PATENT DOCUMENTS 3,123,441  3/1964  Haden, Jr. et al. .................. 23/113
3,411,874  11/1968  Ciric .................................... 23/113
5,268,023  12/1993  Kirner ................................. 95/103
5,415,683  5/1995  Leavitt ................................ 95/101

OTHER PUBLICATIONS

Martens, J.A., et al., "Phase Discrimination with Si MAS NMR in EMT/FAU Zeolite Intergrowths," *J. Phys. Chem* 1993: 5132–35.

Barrer, Richard M. And Sieber, Werner, "Hydrothermal Chemistry of Silicates. Part 21. Zeolites from Reaction of Lithium and Caesium Ions with Tetramethylammonium Aluminosilicate Solutions," *J.C.S. Dalton* 1977: 1,020–26.

*Primary Examiner*—Michael Lewis
*Assistant Examiner*—Thomas G. Dunn, Jr.
*Attorney, Agent, or Firm*—Geoffrey L. Chase

[57] ABSTRACT

The present invention is a method of selective adsorptively separating nitrogen from oxygen using a crystalline metallosilicate having a ZSM-2 structure with a Si/Al ratio less than 2.0 and a lithium cation exchange of at least 50%, wherein the composition has the chemical formula:

$$M_{2/n}O:X_2O_3:(2.0 \text{ to } <4.0)SiO_2$$

wherein M=one or more metal cations having a valence of n, and X is selected from the group consisting of aluminum, gallium and boron, preferably aluminum. The method is conducted at a bed temperature in the range of approximately −100° C. to 100° C.

12 Claims, 3 Drawing Sheets

GAS SEPARATION WITH LITHIUM-CONTAINING ZSM-2 METALLOSILICATES

This is a continuation-in-part application of U.S. patent application Ser. No. 08/241,929, filed May 12, 1994 now abandoned.

FIELD OF THE INVENTION

The present invention is directed to the field of synthetic molecular sieves of the structure ZSM-2 used for gas separations. More specifically, the present invention is directed to an air separation process using crystalline lithium-containing ZSM-2 zeolite.

BACKGROUND OF THE PRIOR ART

Both natural and synthetic crystalline aluminosilicates are known and may generally be described as alumino-silicates of ordered internal structure having the following general formula:

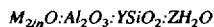

where M is a cation, n is its valence, Y the moles of silica, and Z the moles of the water of hydration.

When water of hydration is removed from the crystalline aluminosilicates, highly porous crystalline bodies are formed which contain extremely large adsorption areas inside each crystal. Cavities in the crystal structure lead to internal pores and form an interconnecting network of passages. The size of the pores is substantially constant, and this property has led to the use of crystalline aluminosilicates for the separation of materials according to molecular size or shape. For this reason, the crystalline aluminosilicates have sometimes been referred to as molecular sieves.

The crystalline structure of such molecular sieves consists basically of three-dimensional frameworks of $SiO_4$ and $AlO_4$ tetrahedra. Isomorphous substitution of boron or gallium for aluminum in a zeolite framework may be achieved. The tetrahedra are cross-linked by the sharing of oxygen atoms, and the electrovalence of the tetrahedra containing aluminum is balanced by the inclusion in the crystal of a cation, e.g., alkali metal or alkaline earth metal ions or other cationic metals and various combinations thereof. These cations are generally readily replaced by conventional ion-exchange techniques.

The spaces in the crystals between the tetrahedra ordinarily are occupied by water. When the crystals are treated to remove the water, the spaces remaining are available for adsorption of other molecules of a size and shape which permits their entry into the pores of the structure.

Molecular sieves have found application in a variety of processes which include ion exchange, selective adsorption and separation of compounds having different molecular dimensions such as hydrocarbon isomers, and the catalytic conversion of organic materials, especially catalytic cracking processes.

U.S. Pat. No. 3,123,441 discloses a lithium aluminum silicate zeolite having a lithium oxide to alumina ratio of 1:1 and a silica to alumina ratio of 2:1.

U.S. Pat. No. 3,411,874 discloses the preparation of a zeolite ZSM-2 which has the chemical formula $M_{2/n}O.Al_2O_3.(3.3-4.0)SiO_2.ZH_2O$. The composition includes lithium as the M specie and is known to have utility for selective adsorption and separation of compounds, such as hydrocarbon isomers. The zeolite is synthesized from a single mixture over a period of from three days up to three months.

J. A. Martens, et al. in an article entitled "Phase Discrimination with $^{29}Si$ MAS MNR in EMT/FAU Zeolite Intergrowths", J. Phys. Chem. 1993, 97, pp 5132–5135, describes the evaluation of ZSM-2. This article interprets NMR results assuming the ZSM-2 structure is an EMT/FAU intergrowth similar to ZSM-3, however Ciric's original work indexes ZSM-2 as a tetragonal lattice different from both the cubic lattice for FAU and the hexagonal lattice for EMT. The structure remains unknown, but has a high readily accessible micropore volume.

R. M. Barrer, et al. in an article "Hydrothermal Chemistry of Silicates. Part 21. Zeolites from Reaction of Lithium and Caesium Ions with Tetramethylammonium Aluminosilicate Solutions", in J.C.S. Dalton 1977, pp 1020–1026, describe the synthesis of ZSM-2 with lithium and cesium and its sorption of nitrogen at −196° C., as well as other sorbates. R. M. Barrer, et. al describes the synthesis and characterization of zeolites produced from aluminosilicate gels containing $Li^+$, $Cs^+$ and $TMA^+$ cations. Li-ZSM-2 was one of the zeolites synthesized during this study. Part of the characterization of LiZSM-2 included measuring the adsorption isotherms for $N_2$ at −196° C., as well as selected hydrocarbons varying in size at 20° C. The results from these studies are given in FIG. 2 of the article and discussed at the bottom of p. 1023. It is very clear from the discussion at the bottom of p. 1023 that the $N_2$ adsorption experiment was done at the boiling point of liquid $N_2$ to measure the pore volume of this zeolite. Under these conditions it is well known to zeolite scientists that the micropores associated with crystalline aluminosilicates having pore openings greater than 4A will rapidly condense $N_2$ at these conditions, filling the pore and thus provide a measure of the micropore volume of the particular zeolite. Barrer, et al also used hydrocarbon adsorption at 20° C. to further probe the effective pore size of the LiZSM-2 and concluded that the pores of LiZSM-2 are accessible to molecules up to the size of neopentane.

This type of "pore filling" adsorption experiment is very different from the behavior of nitrogen or other gases and vapors at a temperature range significantly above the boiling point of the particular gas. In contrast to producing a condensed liquid within the zeolite pores, $N_2$ adsorption at higher temperatures forms an adsorbed phase within the zeolite pore which is much less dense than that obtained at −196° C. This can readily be seen by comparing the amounts adsorbed for $N_2$ at −196° C. in FIG. 2 of the Barrer reference with the amount adsorbed at 23° C., 1 atm in Table 1 of the subject application. Seven times more $N_2$ is sorbed into the zeolite near the boiling point of nitrogen (i. e. 195 cc/g vs 28 cc/g). In addition, at −196° C. air feed would preferentially fill the zeolite pore with oxygen instead of nitrogen because the boiling point of oxygen is 13° C. higher than nitrogen. Clearly the gas condensation in micropores is a different physical event than the selective adsorption of a more strongly interacting gas with extra-framework cations at temperatures far removed from the gas boiling point, such as those given in the subject application.

The prior art fails to provide an air separation process using a synthetic composition that is comparable to lithium X-zeolite and having a more easily synthesized lithium cation form than lithium X-zeolite. The present invention as set forth below uniquely achieves these goals to provide a high performance, novel, selective separation for recovery of oxygen from air.

BRIEF SUMMARY OF THE INVENTION

The present invention is a process of adsorptively separating nitrogen gas from a gas mixture containing nitrogen and a less strongly adsorbed gas, comprising; contacting the gas mixture at an elevated pressure with a zone of adsorbent at a temperature in the range of approximately −100° C. to 100° C. containing crystalline metallosilicate composition having a ZSM-2 structure with a Si/X ratio of less than 2.0 and a cation exchange of more than 80% with a cation selected from the group consisting of lithium, calcium, magnesium, zinc, nickel, manganese and mixtures thereof, wherein X is selected from the group consisting of aluminum, boron and gallium, selectively adsorbing the nitrogen gas preferentially to the less strongly adsorbed gas on said adsorbent, removing an unadsorbed gas containing the less strongly adsorbed gas depleted in nitrogen gas from the zone and separately desorbing and removing the nitrogen gas from the adsorbent.

Preferably, the zone is operated through a series of steps in a cyclical manner comprising; adsorption where the gas mixture contacts the zone at elevated pressure to adsorb the nitrogen gas until the adsorbent approaches saturation with the nitrogen gas and the gas containing the less strongly adsorbed gas and depleted in nitrogen gas is removed as a product, discontinuing adsorption and desorbing the zone to remove adsorbed nitrogen gas from the adsorbent to regenerate the adsorbent, repressurizing the zone with a gas rich in the less strongly adsorbed gas, and repeating the series of steps to conduct a continuous process.

Preferably, the steps are conducted in a plurality of parallel connected adsorption beds as the zone wherein when one bed is conducting an adsorption step another bed is being regenerated. More preferably, the plurality of beds is two parallel connected beds.

Preferably, the less strongly adsorbed gas is oxygen.

Preferably, the gas mixture is air.

Preferably, the adsorption is conducted at a pressure in the range of 10 to 30 psia.

Preferably, the desorption is conducted at a pressure in the range of 0.1 to 7 psia.

Preferably, the gas containing the less strongly adsorbed gas and depleted in nitrogen gas is at least 90% oxygen by volume. More preferably, the gas containing the less strongly adsorbed gas and depleted in nitrogen gas is at least 93% oxygen by volume.

Preferably, the zone of adsorbent is at a temperature in the range of approximately −40° C. to 70° C.

More preferably, the zone of adsorbent is at a temperature in the range of approximately −10° C. to 50° C.

DETAILED DESCRIPTION OF THE INVENTION

The present invention is directed to separation of nitrogen gas from a gas mixture containing nitrogen and at least one less strongly adsorbable gas component using a crystalline metallosilicate composition having a ZSM-2 structure having the chemical composition:

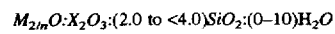

$M_{2/n}O:X_2O_3:(2.0 \text{ to } <4.0)SiO_2:(0-10)H_2O$ wherein M equals one or more metal cations having a valence of n, such as $(0.20-1.0)Na_2O:(0.80-0.0)K_2O$, and X selected from the group consisting of aluminum, gallium and boron. Preferably, the X constitutes aluminum. Preferably, the predominant cation is lithium, calcium, or combinations thereof with the remainder of the cation content being sodium, potassium, magnesium, zinc, nickel, manganese or mixtures thereof. The predominant cation exchange level can preferably be greater than 50%. Although the silicon dioxide to aluminum oxide ratio is in the range of 2:1 to <4.0:1 (Si/Al=1 to <2.0), the preferred compositional ratio approximates <2.8 (Si/Al<1.4), more preferably 2.0 (Si/Al=1).

Figure 3A:
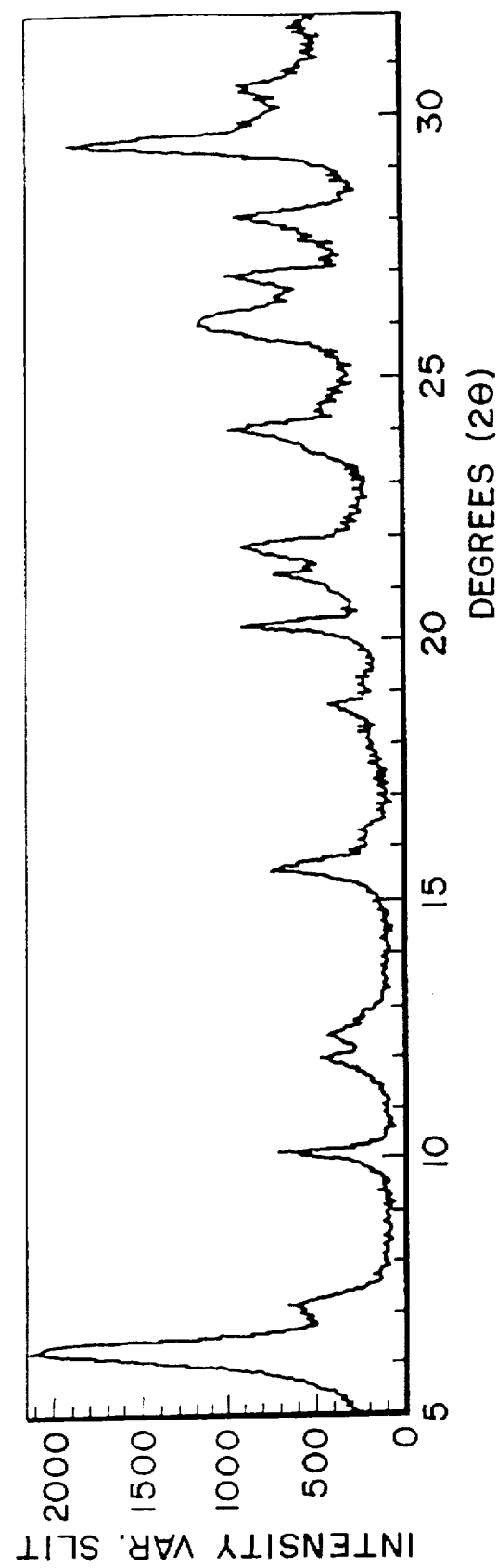
FIG. 3(a) is an x-ray diffraction (XRD) pattern of the ZSM-2 material of Example 1 herein.
Figure 3B:
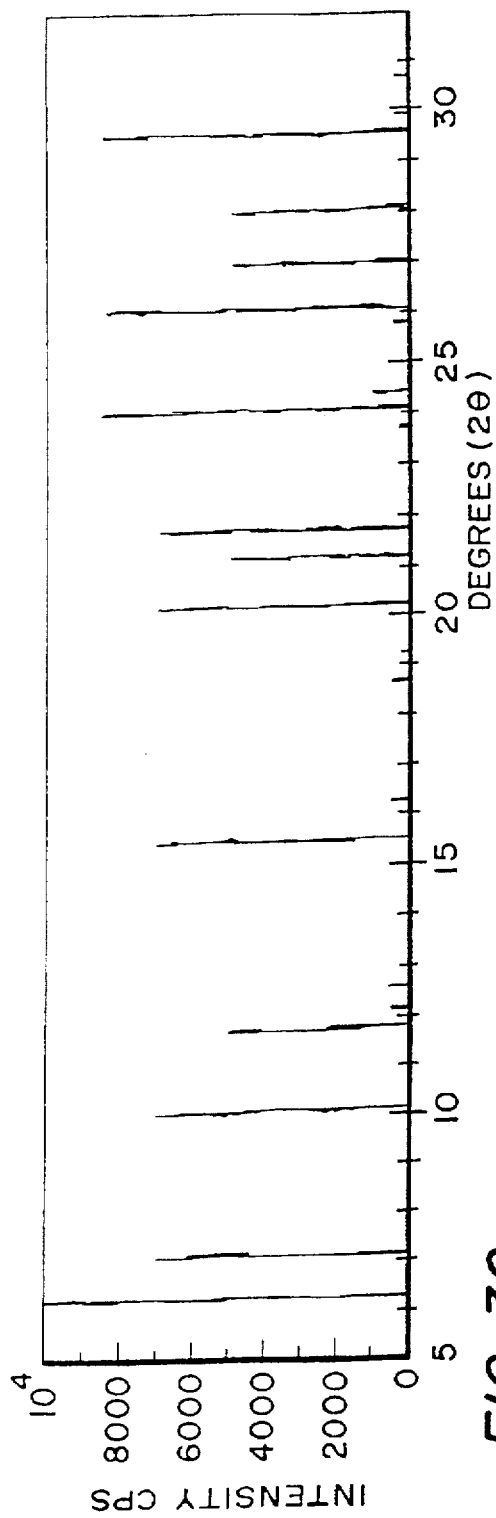
FIG. 3(b) is a stick pattern rendition of the tabular compilation of the XRD pattern reported for ZSM-2 in Barrer and Sieber. J. Chem. Soc. Dalton, 1020 (1977).
Figure 3C:
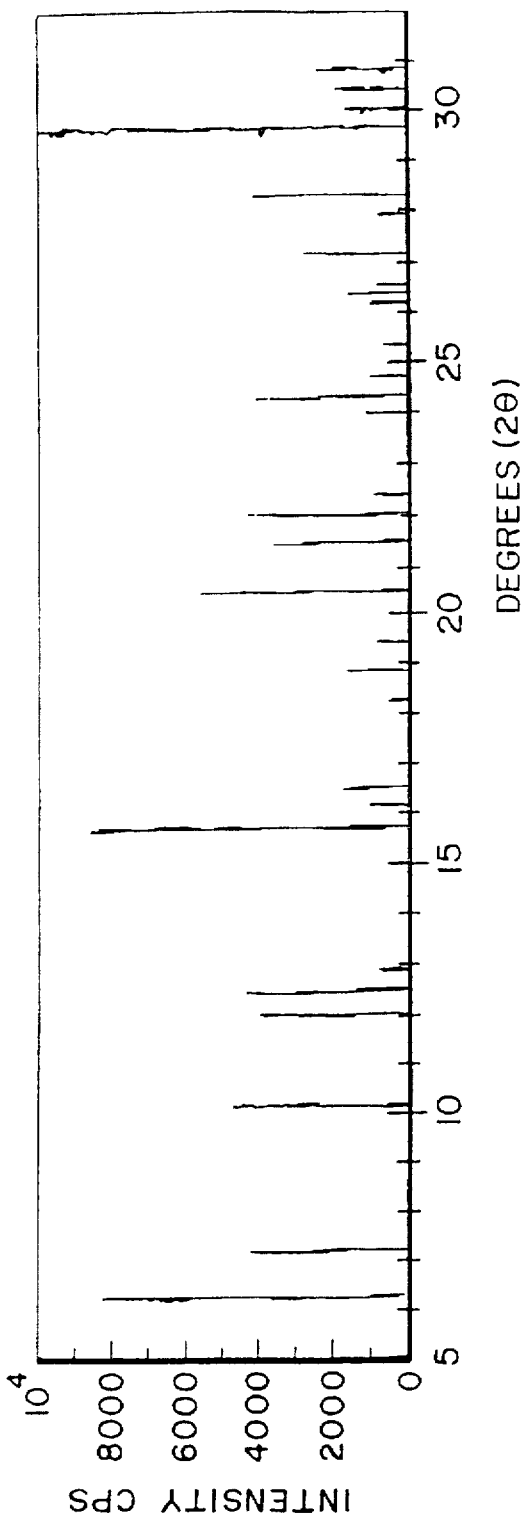
FIG. 3(c) is a stick pattern rendition of the tabular compilation of the XRD pattern reported for ZSM-2 in U.S. Pat. No. 3,411,874.

ZSM-2 is an art-recognized aluminosilicate material having a defined XRD pattern that has been reported in the literature on a number of occasions, such as in Barrer and Sieber, J. Chem Soc. Dalton, 1020 (1977) and in U.S. Pat. No. 3,411,874. FIG. 3(a) sets forth the ZSM-2 material synthesized in Example 1 herein. This XRD pattern provides a positive identity and correlation with the stick pattern renditions of the tabular reports of the XRD patterns for ZSM-2 reported in the prior art, in accordance with FIG. 3(b), Barrer, et al., and FIG. 3(c), U.S. Pat. No. 3,411,874.

ZSM-2 has been found to be comparable to LiX-type adsorbents for producing $O_2$ product from sorptive air separation. Since it is synthesized predominately in the lithium form and can be readily converted to the pure lithium exchanged form it offers a simpler route to prepare highly efficient $N_2$ selective adsorbents.

In using the ZSM-2 materials to separate nitrogen from a gas mixture, the adsorbent process is operated at a bed temperature in the range of approximately −100° C. to 100° C., preferably −40° C. to 70° C., most preferably −10° C. to 50° C.

The following examples demonstrate the present invention in greater detail. The Si/Al ratios determined from elemental analysis are given in parentheses following the adsorbent type.

EXAMPLE 1

Preparation of LiZSM-2(1.6)

The preparation of ZSM-2 is based on the method reported by Barrer and Sieber (J. Chem. Soc. Dalton, 1020 (1977). A solution of tetramethylammonium hydroxide (TMA) containing 2.0 M [OH] is heated to 90° C. Aluminum isopropoxide is added. After cooling to 40° C., a 50/50 wt/wt mixture of tetramethyoxysilane and methanol is added under vigorous stirring. The alcohols formed by the hydrolysis are boiled off. The resulting tetramethylammonium aluminosilicate gel is transferred into a polypropylene bottle. An aqueous 0.9M LiCl solution is added under stirring. The molar composition of the crystallization mixture is $(SiO_2)_{2.0}(Al_2O_3)0.5(TMAOH)_{2.5}(LiCl)_{1.5}(H_2O)_{109}$. The gel mixture is aged 24 hours at ambient temperature then heated to 90° C. for 48 hours, then the solids are recovered, washed with water and dried at 60° C. overnight. The XRD pattern of the isolated crystalline product is in excellent agreement with that reported by Barrer, et al (FIG. 3(b) herein). Thermal analysis using thermal gravimetric analysis/differential thermal analysis (TGA/DTA) show the pure as synthesized ZSM-2 contains 2–3 wt % TMA and already has 95% of its total exchange capacity in the Li form. The 100% LiZSM-2 is obtained by two batch exchanges at 100° C. with 20 cc/g 0.5M LiCl. The elemental analysis shows the sample has a framework Si/Al =1.6.

EXAMPLE 2

Preparation of CaZSM-2

The Ca form of ZSM-2 is prepared by three progressive batch exchanges at 100° C. for four hours. The first exchange is with 0.05N solution at ambient temperature and then a second exchange at 100° C., and a final exchange using 0.5N $CaCl_2$ at 100° C. This procedure produces a CaZSM-2 having over 90% of its exchangeable cation content in the Ca form.

EXAMPLE 3

Preparation of Li|Ga|ZSM-2

Ga incorporation into ZSM-2 is achieved by adding $Ga(NO_3)_3$ to the LiCl solution such that the Ga/Al ratio in the gel equals 0.1 and the element |IV/III| valency ratio equals 1.45. All other conditions are the same as those described above for ZSM-2 synthesis except the gel was aged at 40° C. for 92 hours then crystallized at 90° C. for 7.5 hours. The XRD of the isolated product corresponds to phase pure ZSM-2. This sample was converted to the 100% Li form using the Li exchange procedure described above.

EXAMPLE 4

Comparative Adsorption Properties

The adsorption properties for the compositions of Examples 1 to 3 were compared to two different LiX controls having Si/Al ratios of 1.2 and 1.5 and a CaX control having Si/Al ratio of 1.2, respectively. Table 1 gives the $N_2$ and $O_2$ adsorption capacities at 23° C., 1 atm along with the micropore volume.

TABLE 1

| Example | Micropore Vol (cc/g) | $N_2$ Capacity 23° C., 1 atm (cc/g) | $O_2$ Capacity 23° C., 1 atm (cc/g) |
| --- | --- | --- | --- |
| 1 LiZSM-2(1.6) | 0.36 | 19.2 | 4.5 |
| 2 CaZSM-2 (1.6) | 0.28 | 28.5 | 9.0 |
| 3 Li|Ga|ZSM-2 (1.5) | 0.29 | 19.1 | 4.3 |
| Controls | | | |
| LiX (1.2) | 0.32 | 23.6 | 4.7 |
| LiX (1.5) | 0.33 | 18.1 | 4.3 |
| CaX (1.2) | 0.29 | 28.1 | 8.4 |

Figure 1:
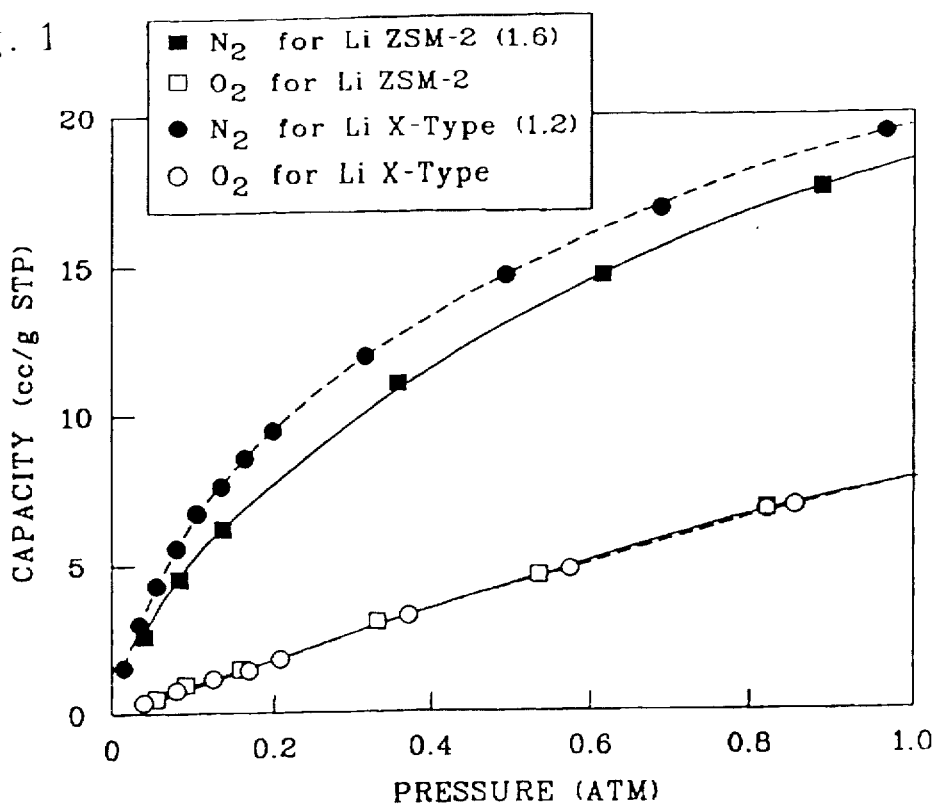
FIG. 1 is nitrogen and oxygen isotherms taken at 23° C. for lithium exchanged X-zeolite (Si/Al=1.2) and ZSM-2 (Si/Al=1.6) at different silica to alumina ratios for the adsorbents.
Figure 2:
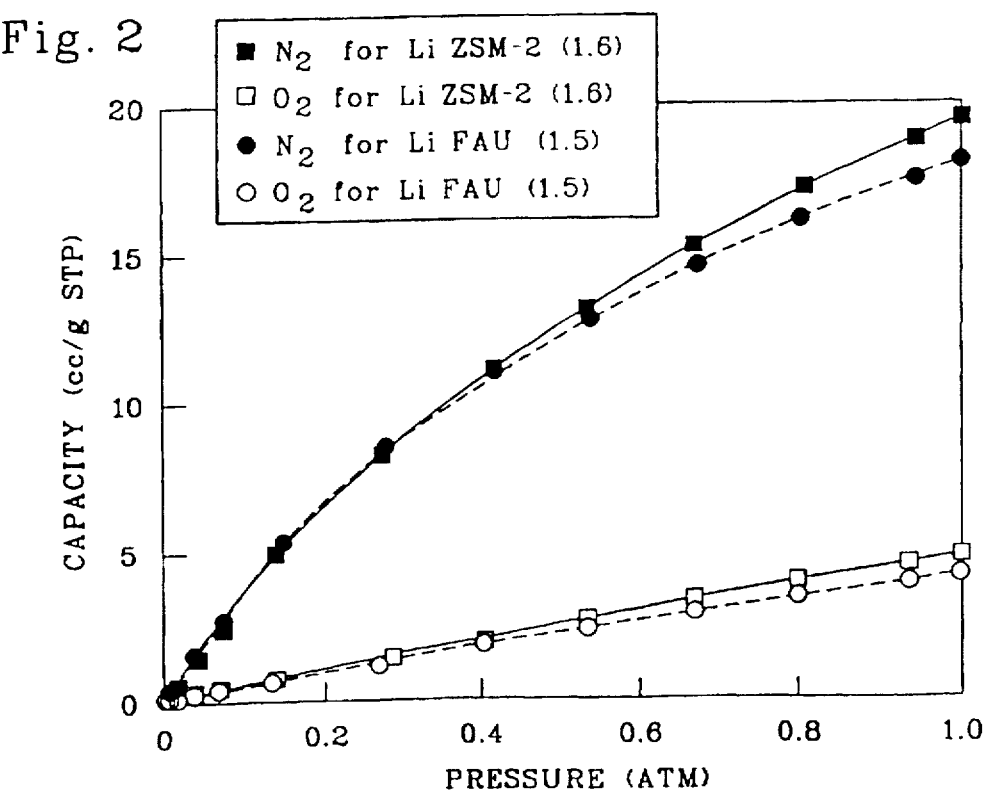
FIG. 2 is nitrogen and oxygen isotherms taken at 23° C. for lithium exchanged FAU (X)-zeolite (Si/Al=1.5) and ZSM-2 (Si/Al=1.6) at comparable silica to alumina ratios for the adsorbents.

The above data clearly shows that the lithium and calcium forms of ZSM-2 have $N_2$ and $O_2$ adsorption capacities similar to X-type adsorbents. The isotherms between 0 to 5 atmospheres for the lithium forms of standard X-type (Si/Al=1.2) and ZSM-2(1.6) are shown in FIG. 1. In addition to having similar capacities at ambient conditions, they have a similar shape, suggesting that the working capacities for a given process will also be comparable. At similar Si/Al ratios, the adsorption properties of LiZSM-2(1.6) and LiX (1.5) are comparable. In addition, FIG. 2 shows that the isotherms are also similar, suggesting again that their performance in a standard pressure swing adsorption (PSA) process will be similar. Similar adsorption capacities are also found for the calcium forms. In both ZSM-2 and X-type adsorbent, the increased $N_2$ capacity (compared to Li) is also accompanied by an increase in $O_2$ capacity which makes it less desirable for air separation. Results for Example 2 indicate that Ga incorporation into the framework does not significantly alter the air separation properties.

EXAMPLE 5

Predicted Performance for $O_2$ VSA

In order to evaluate the potential of the adsorbents of this invention for air separation, N2 and O2 isotherms were measured for the adsorbents from 0 to 8 atmospheres at 23° C. and 45° C. The data was then used in a global equilibrium model (GEM). Using the GEM the O2 performance were calculated for a standard cycle (Air feed at 75° F., 1000 torr with evacuation at 300 torr). Table 2 below presents the calculated selectivities and O2 recovery and bed sizing factors for LiZSM-2(1.5), Li|Ga|ZSM-2(1.5), and the controls LiX and CaX(1.2), both known to be effective in large scale applications.

TABLE 2

| Adsorbent | Selectivity at 30° C. | Predicted $O_2$ Recovery (%) | Bed Size Factor (×10³) |
| --- | --- | --- | --- |
| Example 1 | 6.2 | 58.5 | 15.3 |
| Example 3 | 6.2 | 58.7 | 15.6 |
| LiX (1.2) control | 7.9 | 62.4 | 13.7 |
| CaX (1.2) | 6.8 | 50.7 | 19.2 |

The results above show the performance of the adsorbents of the present invention described in Examples 1 and 3 is a little less than that found for LiX(1.2). This is presumably due to the greater number of cations present in LiX because of its higher framework aluminum content. The results strongly suggest that a LiZSM-2 having a lower Si/Al ratio should be at least comparable to the Li X-type having a similar Si/Al ratio. The results for CaX are included in Table 2 to show that even though the selectivity is similar, the recovery is significantly lower and the bed sizing factor is significantly larger than for LiZSM-2 type adsorbents. This further supports the conclusion that the adsorbents of this invention are highly effective for producing O2 from air using standard PSA cycles.

It is anticipated that the greater the lithium content in ZSM-2, the more benefit to an air separation process from the higher $N_2$ selectivity. Lithium content can be increased by incorporating more exchange capacity by increasing the aluminum content. For a given Si/Al ratio, higher degrees of lithium exchange are better. Exchange levels approaching a 100% are probably desirable; however, in ZSM-2 type adsorbents, the crystallized product before any ion exchange already contains about 95% lithium. The benefits of additional exchange versus the additional processing have to be considered.

The adsorbents of the present invention are ideally suited for optimization of the adsorption properties and isotherm shape by varying the cation content. Based upon prior evidence, mixed divalent lithium-containing sieves can be very effective for selectively adsorbing $N_2$. Using standard ion exchange techniques, it is possible to produce a wide variety of mixed cation forms of ZSM-2. Magnesium, calcium, zinc, nickel, or manganese in combination with lithium are contemplated by the present invention.

Dehydration of the adsorbent can be carried out using any method which will remove the water to below 1 wt % without damaging the zeolite structure or leaving the divalent cations in a highly hydroxylated state.

Gases applicable to separation using these adsorbents are mixtures which contain at least one less weakly interacting gas component compared to $N_2$, such as; oxygen, argon, hydrogen, and helium. These adsorbents should be effective in separating any two gases which differ in the strength of the gas surface interaction. In all cases the more strongly adsorbed gas will be selectively adsorbed producing an enriched stream of the more weakly interacting component.

Although highly lithium exchanged X-type adsorbents have been taught to be effective, it is difficult to achieve high levels of lithium incorporation without using large excesses of expensive lithium salts. Low utilization of lithium leads to higher production costs making them less desirable. In contrast, the ZSM-2 as synthesized contains about 95% lithium and 3 to 5% TMA cations. Complete exchange of Li does not require any calcination and can be done more easily than in X-type zeolites. It may not even be necessary to do any post synthetic exchange or other modification since the crystallized product contains about 95% lithium already.

The present invention has been set forth with regard to several preferred embodiments, however the full scope of the present invention should be ascertained from the claims.

We claim:

1. A process of adsorptively separating nitrogen gas from a less strongly adsorbed oxygen gas in a gas mixture containing nitrogen gas and a less strongly adsorbed oxygen gas, comprising; contacting said gas mixture at an elevated pressure with a zone of adsorbent at a temperature in the range of approximately −100° C. to 100° C. containing crystalline metallosilicate composition having a ZSM-2 structure with a Si/X ratio of less than 2.0, and a cation exchange of more than 80% with a cation selected from the group consisting of lithium, calcium, magnesium, zinc, nickel, manganese and mixtures thereof, wherein X is selected from the group consisting of aluminum, boron and gallium, selectively adsorbing said nitrogen gas preferentially to said less strongly adsorbed oxygen gas on said adsorbent, removing an unadsorbed gas containing said less strongly adsorbed oxygen gas and depleted in said nitrogen gas from said zone and separately desorbing and removing said nitrogen gas from said adsorbent.

2. The process of claim 1 wherein said zone is operated through a series of steps in a cyclical manner comprising; adsorption where said gas mixture contacts said zone at elevated pressure to adsorb said nitrogen gas until said adsorbent approaches saturation with said nitrogen gas and said gas containing said less strongly adsorbed oxygen gas and depleted in said nitrogen gas is removed as a product, discontinuing adsorption and desorbing said zone to remove adsorbed nitrogen gas from said adsorbent to regenerate said adsorbent, repressurizing said zone with a gas rich in said less strongly adsorbed oxygen gas, and repeating said series of steps to conduct a continuous process.

3. The process of claim 2 wherein said steps are conducted in a plurality of parallel connected adsorption beds as said zone wherein when one bed is conducting an adsorption step another bed is being regenerated.

4. The process of claim 3 wherein said plurality of beds is two parallel connected beds.

5. The process of claim 1 where said gas mixture is air.

6. The process of claim 5 wherein adsorption is conducted at a pressure in the range of 10 to 30 psia.

7. The process of claim 5 wherein desorption is conducted at a pressure in the range of 0.1 to 7 psia.

8. The process of claim 5 wherein said gas containing said less strongly adsorbed oxygen gas and depleted in said nitrogen gas is at least 90% oxygen by volume.

9. The process of claim 5 wherein said gas containing said less strongly adsorbed oxygen gas and depleted in said nitrogen gas is at least 93% oxygen by volume.

10. The process of claim 1 wherein said Si/X ratio is no greater than approximately 1.6.

11. The process of claim 1 wherein said temperature is in the range of approximately −40° C. to 70° C.

12. The process of claim 1 wherein said temperature is in the range of approximately −10° C. to 50° C.

* * * * *